US009009498B1

(12) United States Patent
Prasek et al.

(10) Patent No.: US 9,009,498 B1
(45) Date of Patent: Apr. 14, 2015

(54) ESTIMATING POWER CONSUMPTION FOR A TARGET HOST

(75) Inventors: Phil Prasek, Seattle, WA (US); Alex Nazarov, Bellevue, WA (US); Swayambhuba Kar, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 590 days.

(21) Appl. No.: 12/263,336

(22) Filed: Oct. 31, 2008

Related U.S. Application Data

(60) Provisional application No. 61/089,040, filed on Aug. 14, 2008.

(51) Int. Cl.
*G06F 1/00* (2006.01)
*G06F 9/455* (2006.01)

(52) U.S. Cl.
CPC .................................. *G06F 9/45558* (2013.01)

(58) Field of Classification Search
USPC .................. 713/300, 310, 320, 321, 323, 340
See application file for complete search history.

(56) References Cited

U.S. PATENT DOCUMENTS 5,339,445 A * 8/1994 Gasztonyi ..................... 713/324
6,795,928 B2 * 9/2004 Bradley et al. ................ 713/320
6,895,520 B1 * 5/2005 Altmejd et al. ............... 713/324
7,194,385 B2 * 3/2007 Flautner et al. ............... 702/186
7,197,652 B2 * 3/2007 Keller et al. .................. 713/320
7,769,843 B2 * 8/2010 Neuse et al. .................. 709/223
7,814,485 B2 * 10/2010 Morgan et al. ................ 718/100
2005/0044429 A1 * 2/2005 Gaskins et al. ............... 713/300
2006/0184287 A1 * 8/2006 Belady et al. ................. 700/291
2006/0217940 A1 * 9/2006 Cascaval et al. .............. 702/196
2007/0143640 A1 * 6/2007 Simeral et al. ................ 713/320
2008/0072090 A1 * 3/2008 O'Connor et al. ............ 713/330
2008/0082844 A1 * 4/2008 Ghiasi et al. .................. 713/323
2008/0301474 A1 * 12/2008 Bussa et al. ................... 713/300
2009/0007128 A1 * 1/2009 Borghetti et al. ............. 718/104
2009/0265568 A1 * 10/2009 Jackson ........................ 713/320
2009/0271046 A1 * 10/2009 Lewis et al. ................... 700/291
2010/0318828 A1 * 12/2010 Elting et al. .................. 713/340

* cited by examiner

*Primary Examiner* — Khanh Dang
(74) *Attorney, Agent, or Firm* — Clifton L. Anderson

(57) ABSTRACT

A method for estimating power consumption by a target host involves estimating a per-workload in-scenario utilization function of time for each workload running on said host in said what-if scenario so as to yield per-workload in-scenario utilization functions of time. The utilization functions are aggregated to yield a target host utilization function of time. The target host utilization function of time is converted to a host power-consumption function of time.

11 Claims, 2 Drawing Sheets

ESTIMATING POWER CONSUMPTION FOR A TARGET HOST

This patent document claims the benefit of the filing date of 2008 Aug. 14 filing date of U.S. Provisional Application 61/089,040.

BACKGROUND

With energy costs rising and computer systems demanding more power, power-consumption has become an increasingly important consideration in planning data centers. Some large installations must address infrastructure limits on the amount of power that can be delivered to a computer system without causing a problem, e.g., tripping a circuit breaker. Accordingly, power ratings for computers and their components can be taken into account when allocating workloads to hosts for running those workloads.

BRIEF DESCRIPTION OF THE DRAWINGS

The figures depict implementations/embodiments of the invention and not the invention itself.

DETAILED DESCRIPTION

Figure 1:
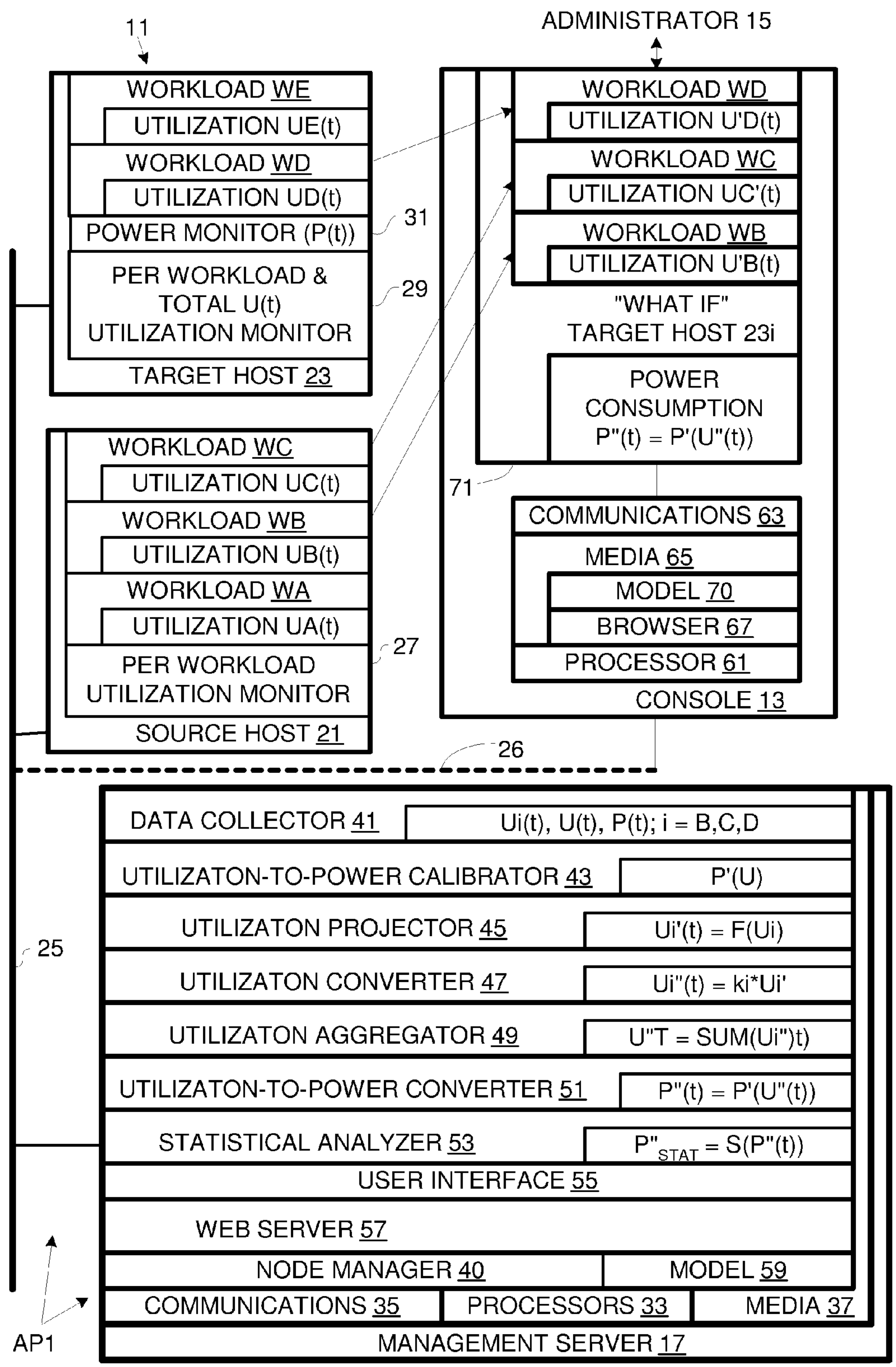
FIG. 1 is a schematic block diagram of a system in accordance with an embodiment of the invention.

In the course of the present invention, it was recognized that using power ratings for computers and components often results in an inaccurate estimation of power consumption for a system configuration under consideration. Most of the time, computers and components operate at power levels substantially below their maximum ratings.

The present invention provides an accurate estimation of power-consumption by a proposed "what-if" host computer configuration. This estimate is generated by aggregating utilization functions of time for individual workloads and then converting the resulting aggregate utilization function of time to a power-consumption function of time for a target host. The power-consumption function of time can be statistically analyzed to provide a variety of possible power consumption statistics, such as average power consumption, peak power consumption, 90% peak power consumption, etc. This approach not only takes the actual requirements of individual workloads into account, but also takes into account packing efficiencies achieved when workload demands peak at different times (e.g., night versus day).

In accordance with an embodiment of the invention, a computer system AP1 includes a data center 11 and a console 13 through which a human administrator 15 can manage data center AP1. Data center 11 includes a management server 17 and managed workload hosts 21 and 23. These systems communicate over a network 25, while console 13 communicates with data center 11 over the Internet 26, or corporate wide-area network (WAN), or a local-area network (LAN). In an example described hereinbelow, host 21 is the source or original of a migrant workload, while host 23 is its target or destination. Accordingly, herein, host 21 is referred to as "source host 21" and host 23 is referred to as "target host 23".

Source host 21 includes a per-workload utilization monitor 27, which indicates the contribution of each workload to utilization of computing resources on source host 21. Utilization monitor 27 tracks processor utilization on a per-workload basis. At the time represented in FIG. 1, workloads WA, WB, and WC are running on source host 21. Accordingly, utilization monitor 27 provides individual utilization histories UA(t), UB(t), and UC(t) respectively for workloads WA, WB, and WC.

Target host 23 includes a utilization monitor 29 and a power monitor 31. At the time represented in FIG. 1, workloads WD and WE are running on target host 23. Utilization monitor 29 provides per-workload utilization histories, e.g., utilization histories UD(t) and UE(t) respectively for workloads WD and WE. Utilization monitor 29 also provides an overall utilization history U(t) for target host 23. Power monitor 31 provides an overall power-consumption history P(t) for target host 23. (Utilization monitor 27 also provides an overall utilization history for source host 21, which also includes a power monitor that provides an overall power consumption history for source host 21 so that the roles of source host 21 and target host 23 can be reversed.)

In the illustrated embodiment, workloads WA-WE are virtual machine guests, running in a virtual machine host on source host 21 and target host 23, each with their own applications, operating systems and management agents. Hosts 21 and 23 are hardware servers plus a host operating system for virtual-machine guests, e.g., workloads WA-WE. Other embodiments of the invention include different types of workloads, e.g., each of plural applications running on a common operating system can be considered a workload that can be migrated independently of other applications running on the same operating system. In the illustrated embodiment, the utilization is processor utilization, the percentage of processor cycles actually doing work. Processor utilization has been shown to correlate well with power consumption of a system as a whole. In other embodiments, utilization of other components, e.g., storage media and communications devices, can be monitored instead of or in addition to processors.

Management server 17 includes processors 33, communications devices 35, and computer-readable storage media 37, a manufacture for storing physical manifestations of data and instructions for manipulation and execution by processors 33. These programs include a node manager 40, which includes a data collector 41, a utilization-power calibrator 43, a utilization projector 45, a utilization converter 47, a utilization aggregator 49, utilization-to-power converter 51, a statistical analyzer 53, a user interface 55, and a web server 57. In addition, node manager 40 can include a power-consumption estimation model 59, as explained further below.

Node manager 40, directly or by virtue of its components 41-57, manages hosts 21 and 23 and workloads WA-WE. In particular, node manager 40 provides for adding, deleting, and migrating workloads to, from, and between hosts 21 and 23. This functionality is provided to administrator 15 through a user interface 55, which is made available to a console 13 via web server 57. The what-if configuration represented at graphical representation 23*i* of host 23 depicts the simulated migrations of workloads from, and between hosts 21 and 23, that is the desired state for target 23.

Console 13 includes a processor 61, communications devices 63, and a manufacture in the form of computer-readable storage media 65 encoded with data and programs computer-executable instructions. In particular, media 65 can store a world-wide-web browser 67 and a model 70 of data center 11. Console 13 includes a touchscreen display 71. FIG. 1 represents a state after user 15 has manipulated workload icons to represent a what-if configuration 73 for target host 23. In what-if configuration 73, host 23 runs workloads WB-WD. Workload WE has been deleted from target host 23, and workloads WB and WC have been migrated from source host 21 to target host 23. Workload WA remains on source host 21.

Figure 2:
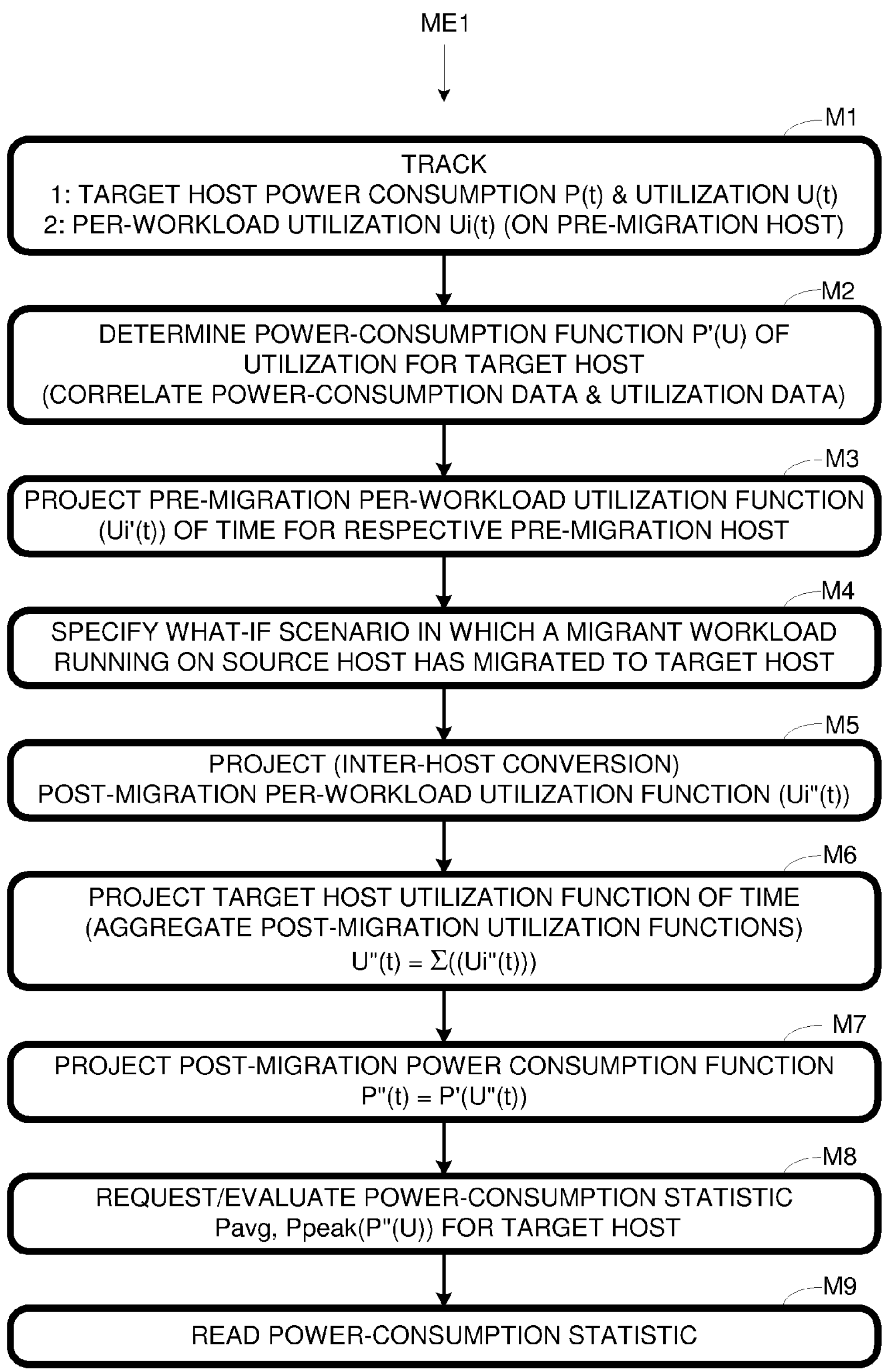
FIG. 2 is a flow chart of a method in accordance with an embodiment of the invention.

System AP1 provides for projecting a power-consumption function U"(t) of time for configuration 73 using a method ME1, flow charted in FIG. 2. At method segment M1, monitors 27, 29, and 31 track per-workload utilization, overall host utilization, and overall-host power consumption. Monitors 27, 29, and 31 provide and data collector 41 collects utilization and power histories. In particular: 1) utilization monitor 27 provides per-workload utilization histories UB(t) and UC(t) for workloads WB and WC in their pre-migration location on source host 21; 2) utilization monitor 29 provides a pre-migration per-workload utilization history UD(t) for workload WD on target host 23; 3) utilization monitor 29 provides a utilization history U(t) for target host 23; and 4) power monitor 31 provides a power history P(t) for target host 23. Other histories are provided as well, but are not used in projecting power-consumption for the configuration of host 23 represented at 23*i*.

At method segment M2, utilization-to-power calibrator 43 determines a function P(U) for calculating power consumption by target host 23 as a function of utilization by host 23. This calculation can involve correlating utilization and power-consumption histories for target host 23. More specifically, a linear regression can be applied to the histories. For hosts without suitable historical data, a power-consumption function of utilization can be obtained by linearly interpolating between minimum and maximum power-consumption specifications for host 23.

At method segment M3, utilization projector 45 projects utilization functions of time for the workloads. In particular, utilization projector 45 detects patterns and trends in per-workload utilization histories and uses them to project respective utilization functions of time. Alternatively, utilization projector 45 can have a user specified growth forecast for each utilization metric including CPU, memory, network, and disk, etc. Specifically, utilization projector 45 determines utilization functions UB'(t), UC'(t), and UD'(t), for workloads WA-WC from histories UB(t), UC(t), and UD(t). Of course, information other than the histories can be used to help project utilization functions of time.

At method segment M4, administrator 15 specifies a what-if reconfiguration of data center 11 to be considered for implementation. To this end, administrator 15 interacts with console 13, which in turn interacts with management server 17. Administrator 15 manipulates objects on touchscreen display 71 to generate new configuration 73 for target host 23. In the illustrated case, workload WE is deleted or migrated to host 21, while workloads WE and WC migrate from source host 21 to target host 23, joining still-resident workload WD.

Method ME1 provides for alternative modes for implementing method segment M4, as well as method segments M5-M8. In a basic mode, administrator 15 is basically interacting with management server 17, with console 13 relegated to the role of a conduit for the interactions. In an enhanced mode, model 59 is copied to provide model 70, which is downloaded to console 13. In this case, administrator 15 interacts with model 70 for the remainder of method ME1. The enhanced approach tends to be more responsive and minimizes network traffic. However, it requires a java or other runtime environment that not all browsers have. The basic mode accommodates browsers with more basic feature sets.

At method segment M5, utilization converter 47 or model 70 projects post-migration utilization functions UB'(t). UC'(t), and UD'(t) for workloads WB-WD. If source host 21 and target host 23 have different numbers and/or types of processors, it is likely that a workload will represent different utilization percentages on the two hosts. Thus, some conversion is required to obtain a post-migration utilization function of time for a migrant workload. In the case of still-resident workload WB no conversion is required, UB'(t)=UB(t). However, in the case of migrant workloads WC and WD, a conversion is required. Typically a linear coefficient will do such that UC'(t)−k*UC(t) and UD'(t)−k*UD(t). The same coefficient is applied to both workloads WC and WD since they are from the same source host. For workloads from different source hosts, different conversion coefficients would generally be required.

At method segment M6, utilization aggregator 49 or model 70 projects target host utilization function U"(t) of time by summing individual workload utilizations UB'(t), UC'(t), and UD' (t). Since time functions are being added, the sum of the peaks is typically higher than the peak of the sums. Thus, workloads can be more efficiently combined using the time functions rather than a constant manufacturer specification.

At method segment M7, utilization-to-power converter 51 or model 70 projects post-migration power consumption P"(t), e.g., by converting post-migration utilization function U"(t) and using power consumption function P'(U) determined at method segment M2.

At method segment M8, administrator 15 requests a statistic characterizing power consumption function P"(t). In response, statistical analyzer 53 or model 70 evaluates post-migration power-consumption function P"(t) to yield one or more statistics such as average power Pavg, peak power Ppeak, or some percentage of peak power.

At method segment M9, console 13 presents the request statistic or statistics on display 71 for administrator 15 to read. Steps M4-M9 can be iterated to evaluate alternative plans for reconfiguring data center 11. A best reconfiguration can be selected based on power consumption alone or based on power consumption and other parameters, such as utilization. These and other variations upon and modifications to the illustrated embodiment are provided by the present invention, the scope of which is defined by the following

What is claimed is:

1. A process comprising:

tracking $U_i(t)$ for each of N virtual-machine guests $VMG_i$, where $U_i(t)$ corresponds to utilization over time of a pre-migration host by an ith virtual-machine guest prior to migration to a target host, where i is an index ranging from 1 to N, and t is time;

projecting $U_i'(t)$ for each $VMG_i$ based at least in part on $U_i(t)$, where $U_i'(t)$ is a projected utilization over time by $VMG_i$ of the respective pre-migration host;

projecting $U_i''(t)$ for each $VMG_i$, based at least in part on $U_i(t)$, where $U_i''(t)$ is a projected utilization over time by $VMG_i$ of the target host, each $U_i''(t)$ having a respective peak value $V_i$;

calculating $U_T''(t)$ at least in part by combining $U_i''(t)$ over i, where $U_T''(t)$ is a projected utilization over time of the target host, $U_T''(t)$ having a peak value $V_T$, the calculating being such that the sum of the peak values $V_i$ is greater than the peak value $V_T$ of the sum; and projecting P"(t) based at least in part on $U_T''(t)$, where P"(t) is a projected power consumption for the target host for a scenario in which all $VMG_i$ are hosted by the target host.

2. A process as recited in claim 1 further comprising:

tracking $U_T(t)$ and $P_T(t)$, where $U_T(t)$ is utilization over time of the target host, and where $P_T(t)$ is a power-consumption over time of the target host; and determining P'(U), based at least in part on $U_T(t)$ and $P_T(t)$, where P'(U) is a power-consumption function of utilization for the target host, wherein the projecting P"(t) being based, at least in part, according to P'($U_T$"(t)).

3. A process as recited in claim 2 further comprising detecting patterns and trends in the $U_i$(t), the projecting $U_i$'(t) being based at least in part on the detected patterns and trends.

4. A process as recited in claim 3 further comprising calculating a time-independent statistic for the scenario based on P"(t).

5. A process as recited in claim 2 wherein the statistic is an average or a peak value for P"(t).

6. A system comprising media encoded with code that, when executed by a processor, implements a process including:

tracking $U_i$(t) for each of N virtual-machine guests $VMG_i$, where $U_i$(t) corresponds to utilization over time of a pre-migration host by an ith virtual-machine guest prior to migration to a target host, where i is an index ranging from 1 to N, and t is time;

projecting $U_i$'(t) for each $VMG_i$ based at least in part on $U_i$(t), where $U_i$'(t) is a projected utilization over time by $VMG_i$ of the respective pre-migration host;

projecting $U_i$"(t) for each $VMG_i$, based at least in part on $U_i$'(t), where $U_i$"(t) is a projected utilization over time by $VMG_i$ of the target host, each $U_i$"(t) having a respective peak value $V_i$;

calculating $U_T$"(t) at least in part by combining $U_i$"(t) over i, where $U_T$"(t) is a projected utilization over time of the target host, $U_T$"(t) having a peak value $V_T$, the calculating being such that the sum of the peak values $V_i$ is greater than the peak value $V_T$ of the sum; and projecting P"(t) based at least in part on $U_T$"(t), where P"(t) is a projected power consumption for the target host for a scenario in which all $VMG_i$ are hosted by the target host.

7. A process as recited in claim 6 further comprising detecting patterns and trends in the $U_i$(t), the projecting $U_i$'(t) being based at least in part on the detected patterns and trends.

8. A system as recited in claim 6 further comprising:

tracking $U_T$(t) and $P_T$(t), where $U_T$(t) is utilization over time of the target host, and where $P_T$(t) is a power-consumption over time of the target host; and determining P'(U), based at least in part on $U_T$(t) and $P_T$(t), where P'(U) is a power-consumption function of utilization for the target host, wherein the projecting P"(t) being based, at least in part, according to P'($U_T$"(t)).

9. A system as recited in claim 8 further comprising calculating time-independent statistic for the scenario based on P"(t).

10. A system as recited in claim 9 wherein the statistic is an average or a peak value for P"(t).

11. A system as recited in claim 6 further comprising the processor.

* * * * *

UNITED STATES PATENT AND TRADEMARK OFFICE

CERTIFICATE OF CORRECTION

PATENT NO. : 9,009,498 B1
APPLICATION NO. : 12/263336
DATED : April 14, 2015
INVENTOR(S) : Phil Prasek et al.

It is certified that error appears in the above-identified patent and that said Letters Patent is hereby corrected as shown below:

Drawings:

In sheet 1 of 2, reference numeral 26, line 2, delete “UTILIZATON” and insert -- UTILIZATION --, therefor.

In sheet 1 of 2, reference numeral 26, line 3, delete “UTILIZATON” and insert -- UTILIZATION --, therefor.

In sheet 1 of 2, reference numeral 26, line 4, delete “UTILIZATON” and insert -- UTILIZATION --, therefor.

In sheet 1 of 2, reference numeral 26, line 5, delete “UTILIZATON” and insert -- UTILIZATION --, therefor.

In sheet 1 of 2, reference numeral 26, line 6, delete “UTILIZATON” and insert -- UTILIZATION --, therefor.

Signed and Sealed this
Twenty-fourth Day of November, 2015

Michelle K. Lee
*Director of the United States Patent and Trademark Office*